F. S. SEYMOUR.
SIGNALING DEVICE FOR VEHICLES.
APPLICATION FILED OCT. 27, 1915.
1,238,348.
Patented Aug. 28, 1917.
2 SHEETS—SHEET 1.
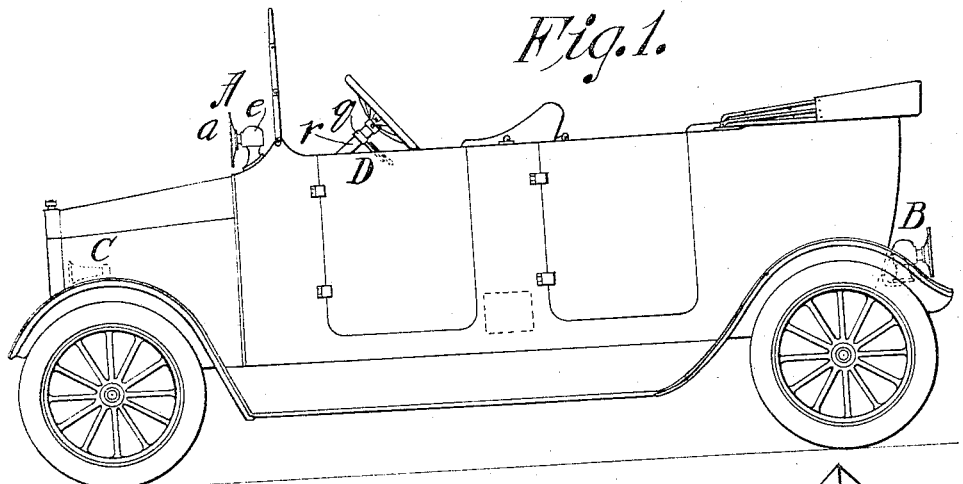
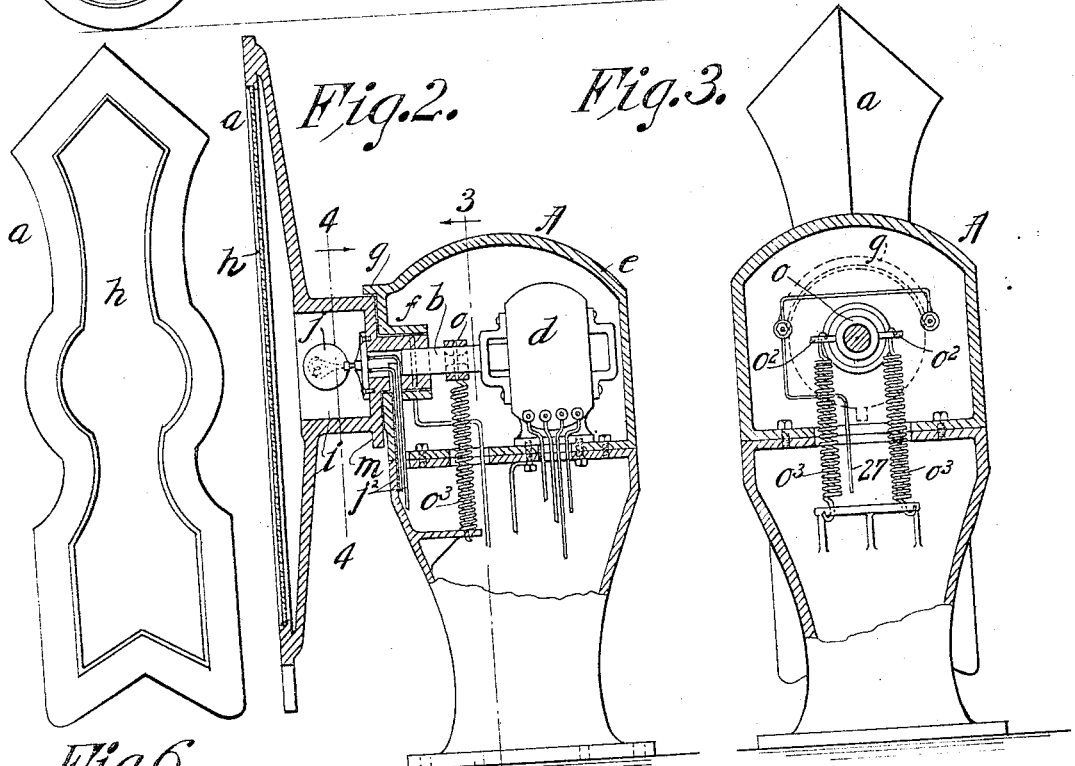
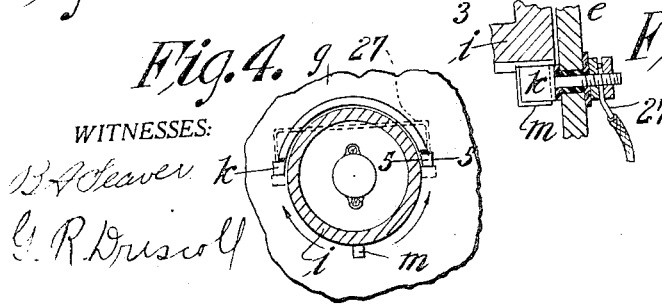
INVENTOR,
Frank S. Seymour,
BY
ATTORNEY.

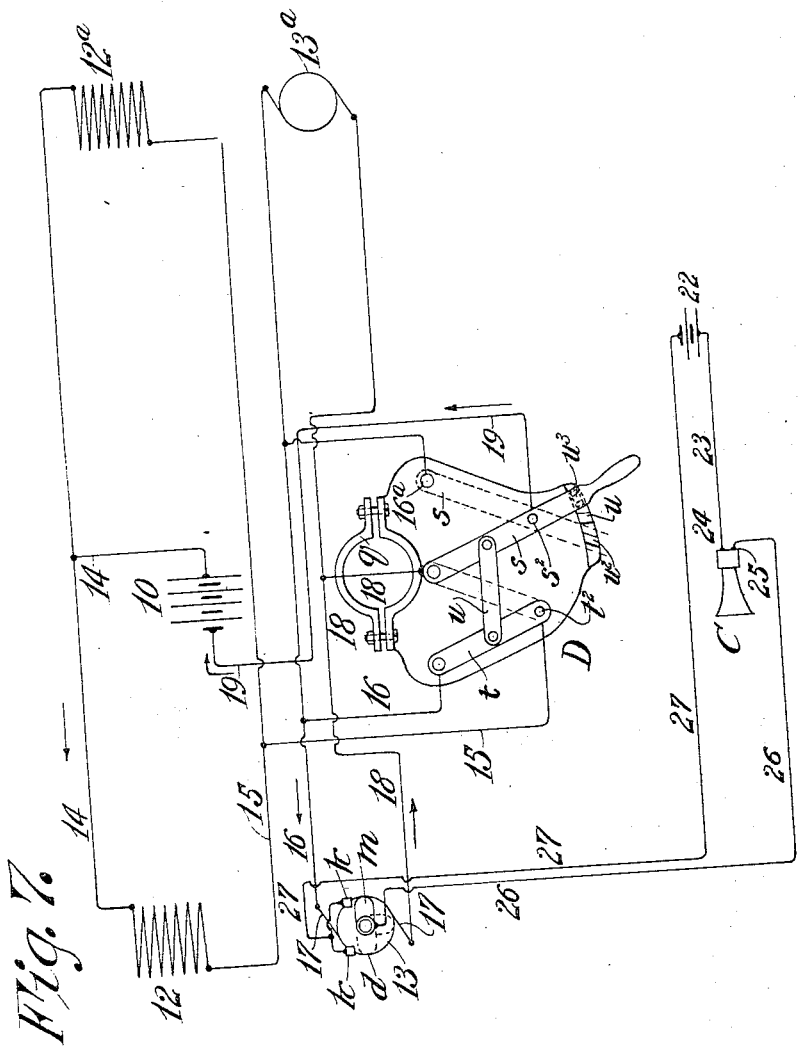

UNITED STATES PATENT OFFICE.

FRANK S. SEYMOUR, OF HOLYOKE, MASSACHUSETTS.

SIGNALING DEVICE FOR VEHICLES.

1,238,348.    Specification of Letters Patent.    Patented Aug. 28, 1917.

Application filed October 27, 1915. Serial No. 58,101.

*To all whom it may concern:*

Be it known that I, FRANK S. SEYMOUR, a citizen of the United States of America, and resident of Holyoke, in the county of Hampden and State of Massachusetts, have invented certain new and useful Improvements in Signaling Devices for Vehicles, of which the following is a full, clear, and exact description.

This invention relates to improvements in signaling devices for vehicles, more especially automobiles, and has for its purpose to change the position of a visual signal from a neutral position to one either directing to the right or left for indicating the direction in which the vehicle is about to be turned.

A further object of the invention is to provide means whereby an audible signal, such for instance as an electric horn, will be sounded in conjunction with the operation of the visual signal, so that when the visual signal is moved to indicate the intention of turning either to the right or left, the horn will be at the same time blown.

Other objects of the invention are to provide simple, practical and efficient operative means, employing electrical agencies and controllers therefor, for the actuation of the signals.

The invention is described in conjunction with the accompanying drawings and is set forth in the claims.

In the drawings:—

Figure 1 is a side elevation showing an automobile and the location thereon of front and rear visual signals, and also at the front, of an electric horn.

Fig. 2 is a sectional view taken from front to rear through the housing by which one of the visual signals is supported and within which an actuating electric motor therefor is contained.

Fig. 3 is a vertical sectional view as taken on line 3—3, Fig. 2.

Fig. 4 is a partial vertical cross section as seen taken on line 4—4, Fig. 2.

Fig. 5 is a partial horizontal sectional view as taken on line 5—5, Fig. 4.

Fig. 6 shows a front view of an approved form of pointer or visual signal.

Fig. 7 is a wiring diagram of the electrical appliances comprised in the present invention.

In the drawings, A represents an electrically operated visual signaling device shown as located on the body of the machine just forward of the wind shield. B represents a similar visual signaling device located at the back of the machine, and C represents an electric horn understood as having its location within the hood.

The visual signal is represented as constituted by the pointer $a$ having the form of an arrow as shown in Fig. 6 and carried on the shaft $b$ of an electric motor $d$ mounted within a housing $e$, which housing at its side at which the pointer is located is formed with a journal support $f$ and with an arc shaped forward projection or narrow hood $g$.

The pointer $a$ may practicably be made as a shallow chambered cast metal frame having an arrow shaped red glass front $h$ set therein, and the rear chambered hub portion $i$ of the pointer frame contains an electric lamp $j$ for illuminating the pointer when the current for such lamp is turned on,—the current wires $j^2$ of the lamp extending through a recess in the hub $f$ of the housing and forwardly to connection with the lamp,—such apertured construction permitting of the rotation of the lamp as one with the pointer without any appreciable distortion of the lamp wiring.

The arc shaped flange or narrow hood $g$ of the housing is provided with oppositely located abutments $k$ $k$ suitably insulated.

The hollow lamp inclosing hub $i$ of the pointer is provided with a stop member $m$ which normally is in a depending position centrally between the said contact members $k$ $k$.

The motor shaft by which the pointer $a$ is carried has a collar $o$ thereon formed with opposite projections $o^2$ with which equalizing springs $o^3$, $o^3$, have connections so that after the motor has been energized for movement in the proper direction to swing the pointer through a quarter turn and as limited by the engagement of the parts $m$ and $k$ and then deënergized, the pointer will be automatically restored to its vertical and neutral position.

The motor $d$ is controlled by a current reversing switch in a general way to be denoted by D in Figs. 1 and 7, and supported by a clamp $q$ which is connected on the steering wheel pillar $r$ of the automobile, such location thereof being, however, merely selective.

The character of the circuit conductors and reversing switch for the motor $d$ will be understood on reference to the diagram, Fig. 7.

The switch comprises a switch lever $s$ pivoted at $s^2$ on the supporting switch plate. Opposite and parallel with the switch lever is a switch bar $t$ pivoted at $t^2$ and connected by link $u$ with the switch lever $s$.

$u$, $u^2$, and $u^3$ represent detent notches in either of which a tooth of the switch lever may engage.

The wiring connections from the battery or other generator 10, through the field 12 and commutator 13 of the motor and the switch will be now described,—the switch lever being shown as thrown to cause the motor to run to turn the pointer, for instance to the right.

The current from the generator 10 passes by wire 14 through the field 12 of the motor, thence by wire 15 to connection with the switch bar $t$ at or near the pivot $t^2$. The current thence passes along the length of the switch bar $t$ and by wire 16 through the commutator by way of its brushes 17, and thence by wire 18 to the movable switch lever $s$, through such lever and then by wire 19 back to the battery 10.

The direction of the current through the field of the motor is constant, but the direction of the current through the commutator is reversed when the switch is thrown from the position shown in Fig. 7 to its reversed position, indicated by the dotted lines,—such reversal changing the running direction of the motor causing the turning of the pointer or signal to the opposite side. And, therefore, with the switch shifted to the reversed position, the current coming by wire 15 from the field of the motor to the switch lever $t$ passes by way of switch lever to have connection between wires 15 and 18 for the passage of the current through wire 18 in the opposite direction to the commutator, through the commutator, it thence also oppositely moving by way of wire 16 having terminal contact $16^a$ on which the switch lever $s$ now has engagement, and then through the switch lever by way of the wire 19 back to the generator.

The diagram, Fig. 7, indicates the wiring in, or "tapping in" of the circuit conductors for controlling the motor of the duplicated signal B, understood as located at the back of the vehicle, and of the actuating motor of which signal $12^a$ represents the field and $13^a$ represents the commutator.

The electric horn C,—to be operated from any electric source, such for instance as a battery 22, individual thereto, or other source of electrical supply,—has a wire 23 running from the battery, or electrical source to one terminal 24 of its vibrator, the wire 26 running from the other terminal 25 of its vibrator to electrical connection with the aforementioned stop $m$ on the hub of the pointer signal $a$.

From the opposite pole of the battery 22, the wire 27 runs to branch connections with the insulated abutments $k$ $k$.

When the pointer is in its neutral position and the stop $m$ midway between the abutments $k$, the horn operating circuit will be open, and the horn silent; but when the pointer is, through the switch controlled motor, turned either to the right or to the left, and the stop $m$ is on either of the abutments $k$ $k$, the horn will be sounded and continued to be sounded until the motor current is thrown off by the switch lever $s$.

I claim:—

1. In a signaling device for a vehicle, in combination, a visual signal, and an electric motor on the shaft of which said signal is mounted, means for oppositely limiting the extent of rotation of the signal, a current generator and normally open circuit conductors connected therewith and with said motor and having a current reversing switch for changing the direction of the running movement of the motor and said connected signal, an electric audible signal, and a normally open electric actuating circuit therefor comprising a generator, branches of said circuit having connection with opposite contacts which are provided adjacent the visual signal, and another part of said circuit having connection with a contact member carried by and rotative with the visual signal, and adapted to be brought to bearing against either of said opposite contact members.

2. In a signaling device for a vehicle, in combination, an electric motor mounted at a conspicuous place on the exterior of the vehicle and having a housing through which the shaft of the motor extends, said housing having oppositely located abutments, a visual signal carried by the shaft of said motor and having a stop member for engagement with either of said abutments, a current generator and normally open circuit conductors connected therewith and with said motor, and having a current reversing switch for changing the direction of the running movement of the motor and said connected signal, an electric audible signal having a normally open electrical actuating circuit therefor comprising a generator, branches of said circuit having connections with said opposite abutments and another part of said circuit having connection with said stop member of the rotative visual signal, and adapted, when the visual signal is turned to have such member brought to engagement with either of said abutments to close the audible signal operating circuit.

Signed by me at Springfied, Mass., in presence of two subscribing witnesses.

FRANK S. SEYMOUR.

Witnesses:
G. R. DRISCOLL,
WM. S. BELLOWS.